(12) United States Patent
Liu et al.

(10) Patent No.: US 11,225,044 B2
(45) Date of Patent: Jan. 18, 2022

(54) POROUS COPPER COMPOSITE AND METHOD THEREOF

(71) Applicants: Tsinghua University, Beijing (CN); HON HAI PRECISION INDUSTRY CO., LTD., New Taipei (TW)

(72) Inventors: Yuan-Feng Liu, Beijing (CN); Ze-Cheng Hou, Beijing (CN); Lu Chen, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/391,737

(22) Filed: Apr. 23, 2019

(65) Prior Publication Data

US 2020/0276784 A1 Sep. 3, 2020

(30) Foreign Application Priority Data

Mar. 1, 2019 (CN) .......................... 201910157205.3

(51) Int. Cl.
*B32B 3/02* (2006.01)
*B21D 5/02* (2006.01)
*C22F 1/08* (2006.01)
*B32B 3/26* (2006.01)
*B32B 15/01* (2006.01)

(52) U.S. Cl.
CPC ................ *B32B 3/263* (2013.01); *B21D 5/02* (2013.01); *B32B 15/01* (2013.01); *C22F 1/08* (2013.01); *B32B 2255/06* (2013.01); *B32B 2255/20* (2013.01)

(58) Field of Classification Search
CPC ..... B32B 3/263; B32B 15/01; B32B 2255/06; B32B 2255/20; B21D 5/02; C22F 1/08
See application file for complete search history.

(56) References Cited

U.S. PATENT DOCUMENTS

| | | | |
|---|---|---|---|
| 2009/0081408 A1* | 3/2009 | Chan ....................... | C22C 23/00 428/109 |
| 2016/0308218 A1 | 10/2016 | Ota et al. | |
| 2018/0319664 A1 | 11/2018 | Fu et al. | |
| 2018/0323437 A1 | 11/2018 | Fu et al. | |
| 2019/0203376 A1* | 7/2019 | Meng ....................... | C22C 9/04 |

FOREIGN PATENT DOCUMENTS

| | | |
|---|---|---|
| CN | 107377618 | 11/2017 |
| CN | 108866412 | 11/2018 |
| TW | 201843869 | 12/2018 |

\* cited by examiner

*Primary Examiner* — Nadine G Norton
*Assistant Examiner* — Mahmoud Dahimene
(74) *Attorney, Agent, or Firm* — ScienBiziP, P.C.

(57) ABSTRACT

A method for forming a porous copper composite is provided. At least two carbon nanostructure reinforced copper composite substrates are provided. The at least two carbon nanostructure reinforced copper composite substrates are stacked to form a composite substrate. An active metal layer is disposed on a surface of the composite substrate to form a first a composite structure. The first composite structure is pressed to form a second composite structure. The second composite structure is annealed to form a third composite structure. The third composite structure is de-alloyed to form a porous copper composite.

14 Claims, 6 Drawing Sheets providing at least two carbon nanostructure reinforced copper composite substrates, and stacking the at least two carbon nanostructure reinforced copper composite substrates to form a composite substrate — S1 disposing an active metal layer on a surface of the composite substrate to form a first a composite structure — S2 pressing the first composite structure to form a second composite structure — S3 annealing the second composite structure to form a third composite structure — S4 dealloying the third composite structure to form a porous copper composite — S5

FIG.1

POROUS COPPER COMPOSITE AND METHOD THEREOF

CROSS-REFERENCE TO RELATED APPLICATIONS

This application claims all benefits accruing under 35 U.S.C. § 119 from China Patent Application No. 201910157205.3, filed on Mar. 1, 2019, in the China National Intellectual Property Administration, the contents of which are hereby incorporated by reference.

FIELD

The present disclosure relates to a porous copper composite and a method for making the porous copper composite.

BACKGROUND

Sizes of pores in porous copper can be controlled to be in the range of several micrometers to several tens of nanometers. Porous copper with nanopores has great potential in many functional applications such as electrochemistry, catalysis, molecular detection and new energy. Therefore, a lot of research has been devoted into the preparation of the porous copper with micro-nano pores in recent years.

In addition to regulating the structure of the porous copper to improve the properties to meet new performance requirements, it is also possible to promote the functional application by compounding the porous copper with reinforcements. At present, conventional reinforcements are mostly metal oxides, precious metal coatings and the like. These reinforcements are obtained by modifying the pore walls or ligament surfaces of the porous copper. However, covering the pore walls or ligaments of the porous copper with a reinforcing layer, an intrinsic physicochemical properties of the porous copper are severely hindered.

BRIEF DESCRIPTION OF THE DRAWINGS

Implementations of the present technology will now be described, by way of embodiments, with reference to the attached figures.

FIG. 1 is a flowchart of one embodiment of a method for making a porous copper composite.

DETAILED DESCRIPTION

Figure 2:
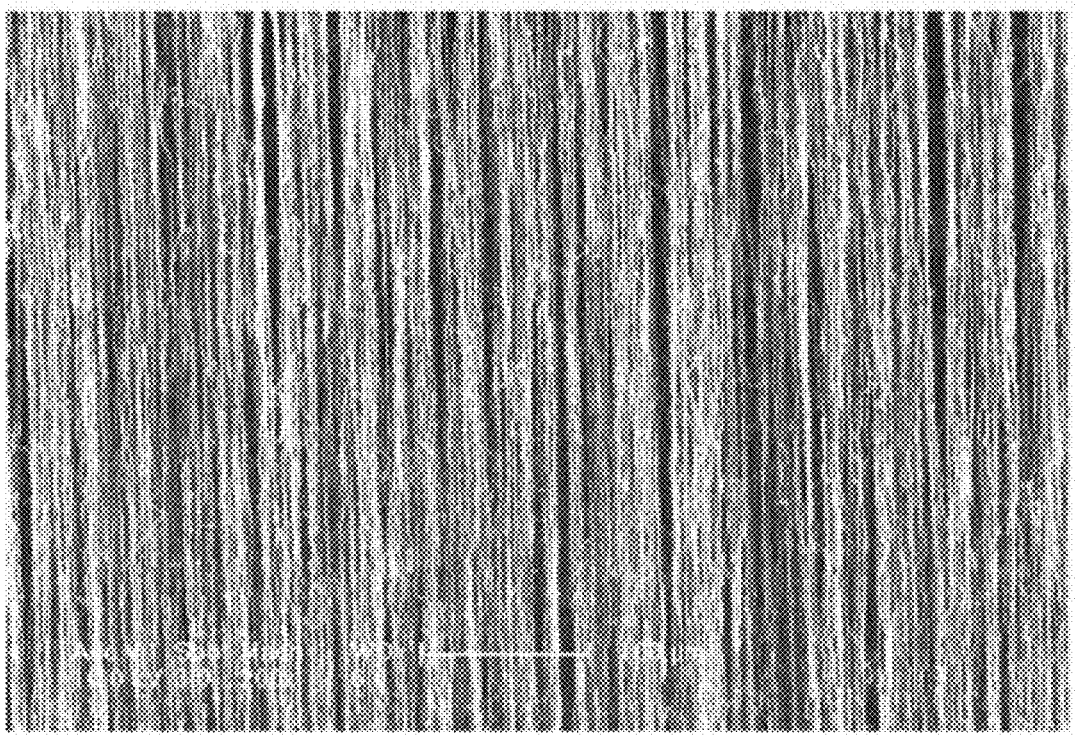
FIG. 2 is a scanning electron microscopy (SEM) of one embodiment of the carbon nanotube drawn film.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Referring to FIG. 1, one embodiment is described in relation to a method for making a porous copper composite. The method comprises steps of:

step (S1), providing at least two carbon nanostructure reinforced copper composite substrates, and stacking the at least two carbon nanostructure reinforced copper composite substrates to form a composite substrate;

step (S2), disposing an active metal layer on a surface of the composite substrate to form a first a composite structure;

step (S3), pressing the first composite structure to form a second composite structure;

step (S4), annealing the second composite structure to form a third composite structure; and step (S5), dealloying the third composite structure to form a porous copper composite.

In step (S1), the carbon nanostructure reinforced copper composite substrate comprises a copper substrate and a carbon nanostructure. The carbon nanostructure is disposed on a surface of the copper substrate to form a carbon nanostructure reinforced copper composite substrate. In one embodiment, when the at least two carbon nanostructure reinforced copper composite substrates are stacked, the copper substrate are in contact with the carbon nanostructure. A layer number and a volume fraction of the carbon nanostructure in the composite substrate can be increased by stacking the at least two carbon nanostructure reinforced copper composite substrates to form the composite substrate. Thus, the volume fraction of the carbon nanostructure in the porous copper composite can be increased.

The copper substrate is a copper sheet. The copper sheet can be a copper sheet commercially available, or can be prepared as needed. A thickness of the copper sheet ranges from about 10 μm to about 1 cm. In one embodiment, the thickness of the copper sheet is about 25 μm.

The volume fraction of the carbon nanostructure in the composite substrate is greater than 0% and less than or equal to 70%. In one embodiment, the volume fraction of the carbon nanostructure in the first composite structure is ranged from about 30% to about 70%. The carbon nanostructure comprises at least one carbon nanotube film or at least one graphene film. The at least one carbon nanotube film or at least one graphene film is sequentially stacked on the surface of the copper substrate. When the carbon nanostructure comprises a plurality of carbon nanotube films, the adjacent two carbon nanotube films can be coplanar or stack on each other. Additionally, an angle can exist between the orientation of carbon nanotubes in adjacent carbon nanotube films, stacked and/or coplanar. Adjacent carbon nanotube films are combined solely by Van der Waals attractive forces therebetween, no external adhesive material is required. An angle between the aligned directions of the carbon nanotubes in the two adjacent carbon nanotube films can range from about 0 degrees to about 90 degrees. In one embodiment, the angle is 0°. When the carbon nanostructure comprises a plurality of graphene films, the adjacent two graphene films can be coplanar or stacked on each other.

The carbon nanotube film can be a carbon nanotube drawn film, a carbon nanotube rolled film, and a carbon nanotube flocculated film. In one embodiment, the carbon nanotube film is the carbon nanotube drawn film.

The carbon nanotube drawn film can be formed by the substeps of: (a) selecting one or more carbon nanotubes having a predetermined width from the super-aligned array of carbon nanotubes; and (b) pulling the carbon nanotubes to form carbon nanotube segments at a constant speed so that the carbon nanotubes are joined end to end to obtain a uniform carbon nanotube drawn film.

In step (a), the super-aligned array of carbon nanotube is grown on a growing substrate by chemical vapor deposition. The super-aligned array of carbon nanotube includes a plurality of carbon nanotubes. The carbon nanotubes in the super-aligned array of carbon nanotube are substantially parallel with each other and perpendicular to the growing substrate. The carbon nanotube segments having a predetermined width can be selected by using a tool such as an adhesive tape, a tweezers, or a clamp to contact the super-aligned array.

In step (b), the pulling direction is substantially perpendicular to the growing direction of the super-aligned array of carbon nanotubes. Each carbon nanotube segment includes a plurality of carbon nanotubes parallel to each other.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. The carbon nanotube drawn film includes a plurality of carbon nanotubes joined ends to ends. The carbon nanotubes in the carbon nanotube drawn film are substantially parallel to the pulling/drawing direction of the carbon nanotube drawn film, and the carbon nanotube drawn film produced in such manner can be selectively formed to have a predetermined width. The carbon nanotube drawn film formed by the pulling/drawing method as disclosed has superior uniformity in thickness and in conductivity over a typical disordered carbon nanotube film. Further, the pulling/drawing method is simple, fast, and suitable for industrial applications.

Referring to FIG. 2, the carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube film is a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

It can be appreciated that some variation can occur in the orientation of the carbon nanotubes in the carbon nanotube drawn film as can be seen in FIG. 2. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded.

Further, in step (S1), a titanium plate can be provided. A copper film is plated on the titanium plate, and the carbon nanostructure is disposed on the copper film, then another copper film is plated on the carbon nanostructure. The copper film and the carbon nanostructure are alternately disposed on the titanium plate substrate to form the composite substrate. In one embodiment, the subsequent steps (S2)-(S5) can be performed after the composite substrate is removed from the titanium plate substrate. In another embodiment, the active metal layer is disposed on the surface of the composite substrate and then the first composite structure is removed from the titanium plate substrate.

In one embodiment, before step (S2), further comprising a step of degreasing the copper substrate to improve bonding between the carbon nanostructure and the copper substrate. In one embodiment, the copper substrate is ultrasonically degreased in an organic solvent, and then the copper substrate is cleaned. The organic solvent can be acetone, or diethyl ether. The copper substrate can be cleaned by alcohol then by pure water after degreasing.

In one embodiment, the method further comprises a step of removing a metal oxide layer from surfaces of the copper substrate before the step of degreasing the copper substrate. In one embodiment, the copper substrate can be rubbed to remove the metal oxide layer from surfaces of the copper substrate. In one embodiment, the copper substrate can be cleaned by an acidic solution to remove the metal oxide layer from surfaces of the copper substrate. The acidic solution can be hydrochloric acid.

In step (S2), the active metal layer is formed by plating a salt solution of an active metal on the surface of the composite substrate to obtain the first composite structure. The active metal layer is a film structure formed by active metal atoms of the salt solution of the active metal. The active metal can be selected from potassium, calcium, sodium, magnesium, aluminum, zinc, iron, tin, and nickel. In the first composite structure, an atomic ratio of copper to the active metal is 2:8-8:2. During the plating process, the active metal atoms enter gaps between adjacent carbon nanotubes in the carbon nanotube film. In one embodiment, the salt solution of the active metal is a $ZnSO_4$ solution, and the active metal layer is a zinc film.

Further, before step S3, further comprising a step of washing and drying the first composite structure to remove a plating solution on the surface of the first composite structure. The first composite structure can be naturally dried or blow dried with nitrogen gas. In one embodiment, the plating solution on the surface of the first composite structure is washed with pure water, and then the surface of the first composite structure is blow dried with nitrogen gas.

In step (S3), a method of pressing the first composite structure is not limited, as long as a thickness of the first composite structure is reduced. The thickness of the first composite structure can be pressed by a rolling mill at room temperature. In one embodiment, the thickness of the second composite structure is less than or equal to 70% of an originally thickness of the first composite structure. In another embodiment, a pressure is applied to upper and lower surfaces of the first composite structure by the roll mill at room temperature, and the resulting thickness of the second composite structure is about half of the thickness of the first composite structure.

During the pressing of the first composite structure, some cracks may be formed on the edges of the first composite structure due to continuous deformation of the first composite structure. In order to avoid the chipping of the first composite structure in the subsequent pressing which will affect the performance of the composite, trimming off the edges of the first composite structure may be performed after step (S3), before step (S4).

In one embodiment, in the process of pressing the first composite structure to form the second composite structure, when the thickness of the second composite structure is compressed to half of the thickness of the first composite structure, the edges of the second composite structure is trimmed by 1 mm to remove the cracks.

In step (S3), further comprising a process of alternatively folding and pressing the second composite structure. The process of alternatively folding and pressing the second composite structure comprises: folding the first composite structure to form a folded composite structure, and then pressing the folded composite structure. The term "the folding and pressing process" when utilized, means "the process of alternatively folding and pressing the first composite structure". A method of folding the first composite structure is not limited. In one embodiment, the first composite structure is folded in half, and the thickness is doubled. In another embodiment, in order to avoid forming the chipping of the composite structure in the subsequent pressing which will affect the properties of the porous copper composite, the cracks at the edge of the formed composite structure can be trimmed off after each the folding and pressing process.

In one embodiment, in each the folding and pressing process, a thickness of the first composite structure after pressing is decreased to less than 70% of a thickness of the first composite structure after folding. In another embodiment, in each the folding and pressing process, a thickness of the first composite structure after pressing is decreased to less than 50% of a thickness of the first composite structure after folding. In one embodiment, the folding and pressing process is repeated more than two times. In one embodiment, the folding and pressing process is repeated 2~16 times. In one embodiment, the folding and pressing process is repeated 4~12 times. The number of the folding and pressing process depends on the thickness of the first composite structure, and comprehensive properties of the porous copper composite as required. The comprehensive properties of the porous copper composite refer to strength, hardness, porosity ratio and electrical conductivity of the porous copper composite. The carbon nanostructures can be uniformly dispersed in the porous copper composite by controlling the number of pressing times.

Compared with the first composite structure without the pressing treatment, the second composite structure obtained after the pressing treatment is dense, and no delamination occurs. A plurality of carbon nanostructures can be stacked in the first composite structure. Thus, the volume fraction of the carbon nanostructure in the porous copper composite is improved. When the plurality of carbon nanostructures are disposed between the copper substrate and the active metal layer, and the first composite structure is not pressed, the plurality of carbon nanostructures are prone to delamination in the subsequent dealloying process to form the porous copper composite. Therefore, step (S3) can not only improve the compactness of the second composite structure, but also avoid the delamination of the subsequently formed porous copper composite. The carbon nanostructure can be uniformly dispersed in the porous copper composite material, and the volume fraction of the carbon nanostructure can be increased in the porous copper composite by step (S3).

In step (S4), annealing the second composite structure at a high temperature to form a third composite structure. The annealing process of the second composite structure can be in a vacuum condition. The annealing process of the second composite structure comprises steps: (a) heating the second composite structure at a high temperature so that atoms of the copper substrate and the active metal layer can be sufficiently thermally diffused; (b) annealing and cooling the second composite structure, wherein the active metal atoms and the copper atoms form an alloy. Different metals have different annealing temperatures. A sufficient diffusion between atoms of substrate and atoms of the active metal can be achieved by controlling the annealing temperature. During the annealing process, since the metal is directly grown on surfaces of the plurality of carbon nanotubes, therefore, a contact resistance between the plurality of carbon nanotubes and the metal is reduced. The resulting second composite structure has a better conductivity than the first composite structure. An interface between the plurality of carbon nanotubes and the metal is a coherent or semi-coherent interface. The annealing temperature is higher than 300° C., and an annealing time ranges from about 12 hours to about 72 hours. In one embodiment, the second composite structure is annealed at a temperature 500° C. for 24 hours, and Zn atoms and Cu atoms are sufficiently diffused to form the alloy with homogenous composition.

The alloy in the third composite structure not only coats on the surface of the carbon nanotube film, but also are located in the gaps between two adjacent carbon nanotubes in the carbon nanotube film, and further coats on a node between the adjacent two carbon nanotubes along a same direction. An end of one carbon nanotube is joined to another end of an adjacent carbon nanotube arranged substantially along the same direction by Van der Waals attractive force.

In step (S5), dealloying the third composite structure to remove the active metal to form a porous structure, thereby obtaining the porous copper composite. A method of dealloying the third composite structure can be a chemical method or an electrochemical method. In one embodiment, the third composite structure can be placed in a dilute acid or a dilute alkali solution, the plurality of active metal atoms in the third composite structure chemically react or electrochemically react with the dilute acid or the dilute alkali. The active metal atoms in the third composite structure are completely reacted to form a porous structure. In another embodiment, the third composite structure is de-alloyed by electrochemical method. An efficiency of electrochemical de-alloying is higher than that of chemical de-alloying. The porous copper composite with different morphologies can be easily obtained by controlling the voltage in electrochemical corrosion. The porous copper composite comprises a plurality of pores. Pore diameters of the porous copper composite range from about 30 nm to about 5 μm. The carbon nanotubes are uniformly dispersed in the porous copper composite. The volume fraction of the carbon nanotube in the porous copper composite is greater than 0% and less than or equal to 70%. The volume fraction of the at least one carbon nanometer structure in the porous copper composite can be obtained by adjusting a content of the at least one carbon nanostructure in the first composite structure.

Figure 3:
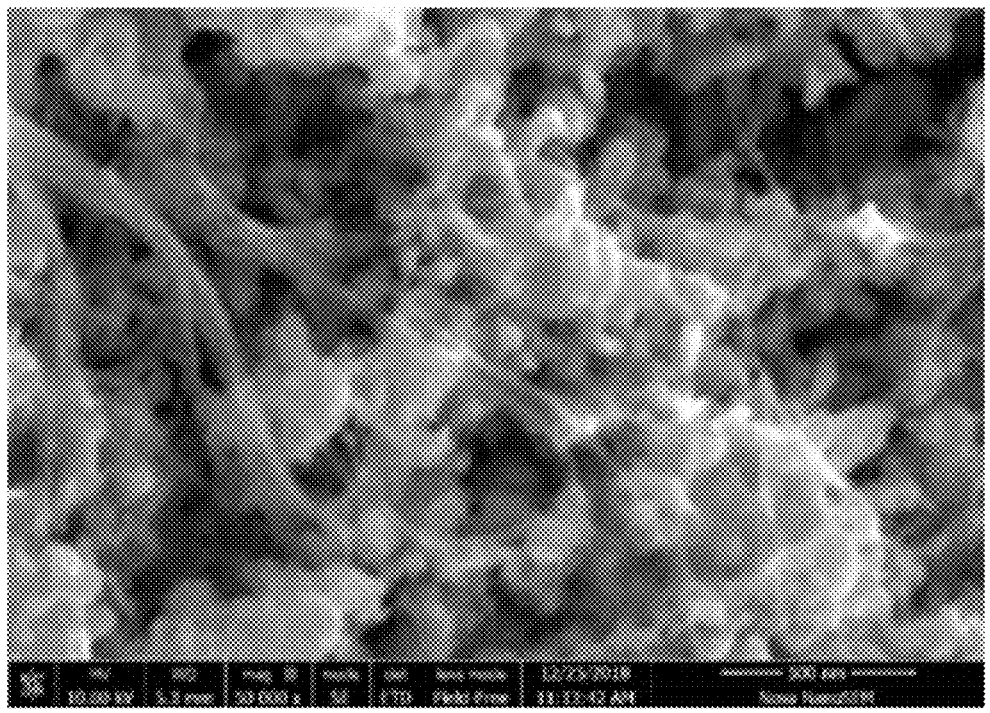
FIG. 3 is a SEM image of one embodiment of the porous copper composite.
Figure 4:
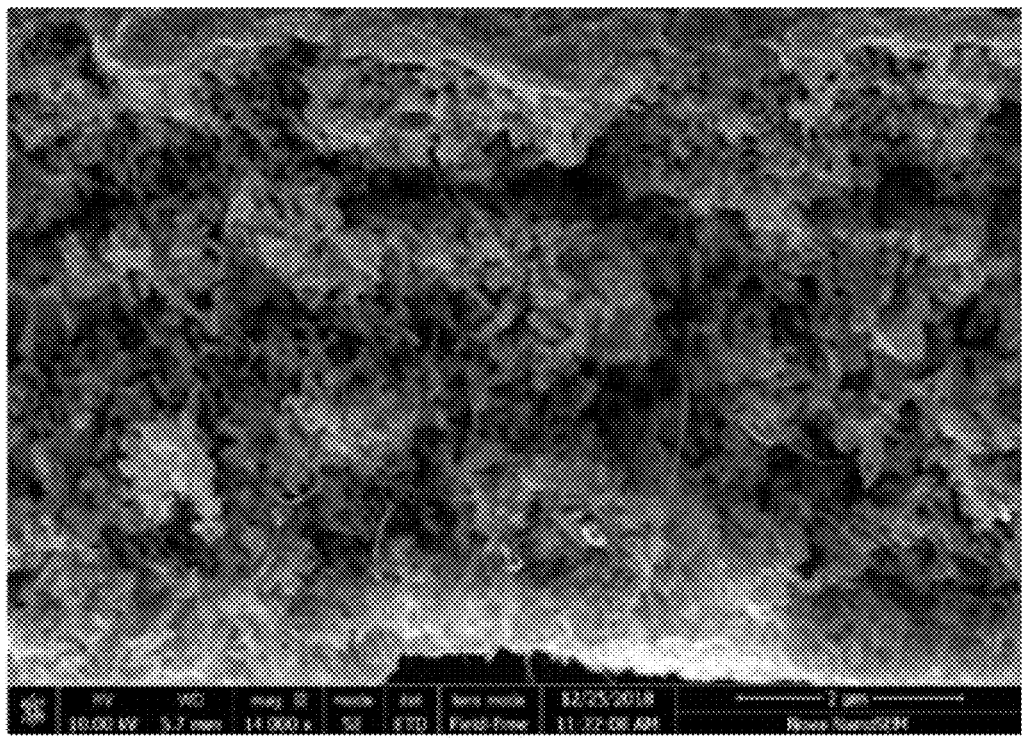
FIG. 4 is a SEM image of one embodiment of the porous copper composite.

Referring to FIG. 3 and FIG. 4, one embodiment of a porous copper composite prepared by the above method for making the porous copper composite is disclosed. The porous copper composite comprises a plurality of copper ligaments and at least one carbon nanostructure. A porous structure is formed by the plurality of copper ligaments, and the at least one carbon nanostructure is uniformly disposed in the plurality of copper ligaments. The volume fraction of the at least one carbon nanostructure in the porous copper composite is greater than 0% and less than or equal to 70%.

The porous copper composite has a three-dimensional network structure. The porous structure comprises a plurality of pores formed between the plurality of copper ligaments staggered with each other. The plurality of pores can be uniformly dispersed or randomly dispersed. Sizes of the pores range from about 30 nm to about 5 micrometers. The method of forming the plurality of pores is not limited.

The carbon nanostructure comprises at least one carbon nanotube film or at least one graphene film. When the carbon nanostructure comprises a plurality of carbon nanotube films, the adjacent two carbon nanotube films can be coplanar or stacked on each other. Additionally, an angle can exist between the orientation of carbon nanotubes in adjacent drawn films, stacked and/or coplanar. Adjacent drawn carbon nanotube films are combined solely by Van der Waals attractive forces therebetween, without external adhesive. An angle between the aligned directions of the carbon nanotubes in the two adjacent drawn carbon nanotube films can range from about 0 degrees to about 90 degrees. In one embodiment, the angle α is 0°. When the carbon nanostructure comprises a plurality of graphene films, the adjacent two graphene films can be disposed in a coplanar or stacked.

The carbon nanotube film can be a carbon nanotube drawn film, a carbon nanotube rolled film, and a carbon nanotube flocculated film. The at least one carbon nanotube film are embedded in the porous structure. One part of the carbon nanotubes in the carbon nanotube film are embedded in the plurality of the copper ligaments, and another part of the carbon nanotubes in the carbon nanotube film are located in the plurality of pores, and/or the others part of the carbon nanotubes in the carbon nanotube film are exposed from surface of the porous structure. In one embodiment, the carbon nanotube film is the carbon nanotube drawn film.

The carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube film is a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

In one embodiment, the porous copper composite consists of the plurality of copper ligaments and the at least one carbon nanostructure. The at least one carbon nanostructure is at least one carbon nanotube drawn film. The at least one carbon nanotube drawn film is disposed in the plurality of copper ligaments. One part of the carbon nanotubes in the carbon nanotube drawn film are embedded in the plurality of the copper ligaments, and another part of the carbon nanotubes in the carbon nanotube drawn film are located in the plurality of pores, and/or the others part of the carbon nanotubes in the carbon nanotube drawn film are exposed from surface of the porous structure. The volume fraction of the at least one carbon nanotube drawn film in the porous copper composite is 40%.

In one embodiment, the carbon nanostructure comprises at least one graphene film. The at least one graphene film is uniformly dispersed in the porous copper composite. The at least one graphene film is composed of a single layer of carbon atoms, and the single layer of carbon atoms is two-dimensionally dispersed. Therefore, the at least one graphene film can be coated on the surface of the plurality of copper ligaments, or embedded in the plurality of copper ligaments, or dispersed in the pores of the plurality of copper ligaments.

Another embodiment is described in relation to a method for making a porous copper composite. The method comprises steps of:

step (S10), providing a carbon nanostructure reinforced copper composite substrates, and disposing an active metal layer on a surface of the carbon nanostructure reinforced copper composite substrates to form a composite substrate;

step (S20), stacking at least two composite substrates to form a first a composite structure;

step (S30), pressing the first composite structure to form a second composite structure;

step (S40), annealing the second composite structure to form a third composite structure; and step (S50), dealloying the third composite structure to form a porous copper composite.

In the second embodiment, Steps (S30) to (S50) are similar as steps (S3) to (S5) of the first embodiment, and step (S10) and step (S20) are different from step (S1) and step (S2).

In step (S20), in one embodiment, the copper substrate and the active metal layer of two adjacent composite substrates are placed in contact with each other.

Before step (S10) after step (S20), further comprising the step of scraping the surfaces of the copper substrate and the active metal layer to expose fresh surface of the copper substrate and the active metal layer. An exposed fresh surface of the active metal layer is directly in contact with an exposed fresh surface of the copper substrate to make the bonding force between the copper substrate and the active metal layer stronger during subsequent pressing. In one embodiment, the copper substrate and the active metal layer are scraped with a metal brush, so that the exposed fresh surface of the active metal layer is directly in contact with the exposed fresh surface of the copper substrate.

Embodiment 1

A copper film having a thickness of 0.5 μm is plated on a titanium substrate, and then a carbon nanotube drawn film is disposed on the surface of the copper film, and then the copper film is plated on the surface of the carbon nanotube film, and the above steps are repeated to form a composite substrate having a thickness of 25 micron. Firstly, the composite substrate is cleaned with hydrochloric acid to remove the oxide layer. Secondly, the composite substrate is degreased with pure water and alcohol. A zinc film is plated on the surface of the carbon nanotube drawn film, and then the titanium plate is removed to form a first composite structure. By controlling plating parameters, a copper-zinc atomic ratio of 35:65 is finally obtained in the first composite structure. The first composite structure is cleaned with pure water, and surfaces of the first composite structure is dried using nitrogen gas. A surface of the roll is cleaned before pressing the first composite structure. The surface of the roll is scrubbed with a soft, dust-free paper soaked with alcohol to remove impurities on the surface of the roll. After the roll cleaning operation is completed, the first composite structure is pressed by the roll to form a second composite structure, and the thickness of the second composite structure is reduced to half of the thickness of the first composite structure. Then, edges of the second composite structure are trimmed by 1 mm. The second composite structure is formed by repeating the folding and pressing process 8 times. After each the folding and pressing process is completed, the edge of the composite structure is trimmed.

Figure 5:
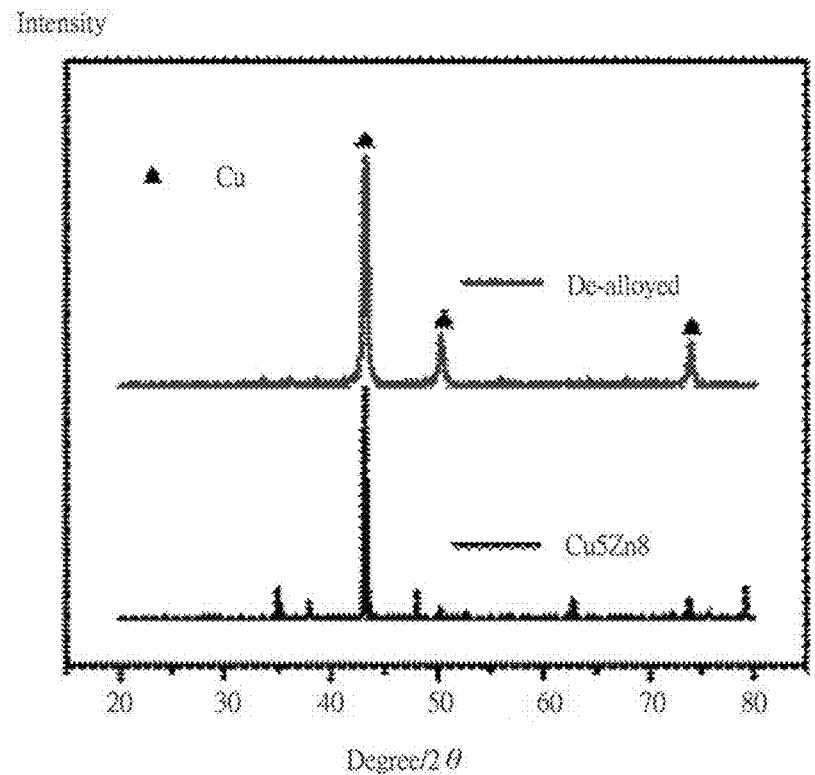
FIG. 5 is an X-Ray diffraction (XRD) pattern of one embodiment of a third composite structure before and after dealloying.
Figure 6:
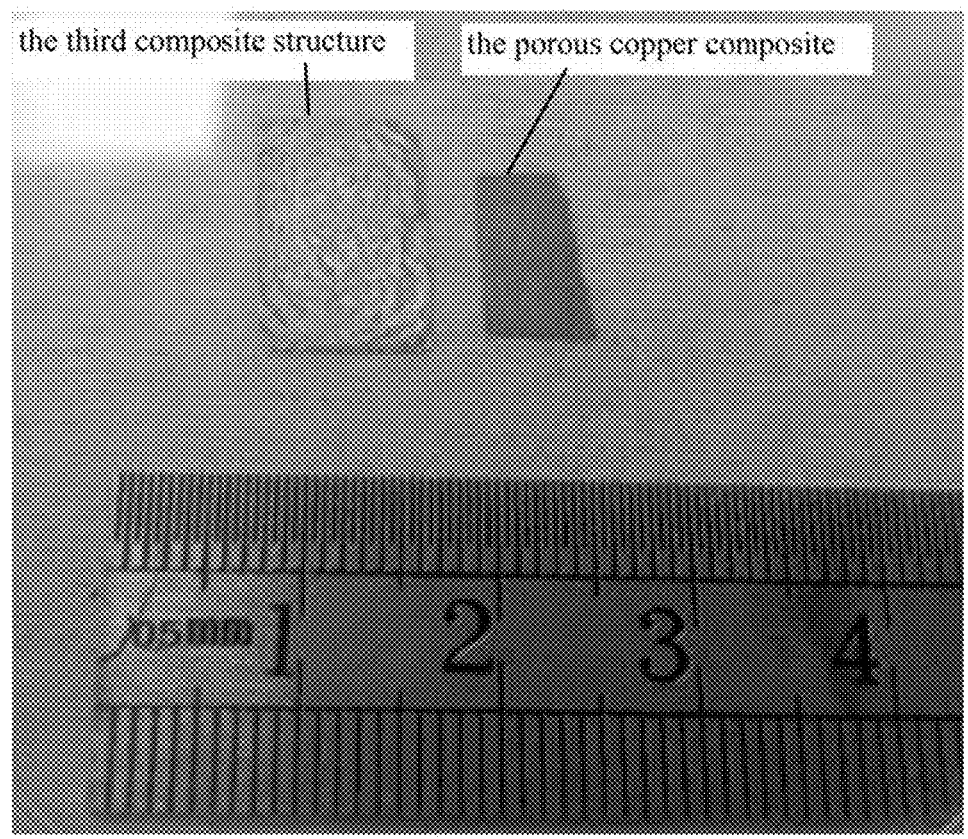
FIG. 6 is comparison image of one embodiment of the third composite structure and the porous copper composite.

The second composite structure is annealed in an argon atmosphere to obtain a third composite structure. An annealing temperature was 300° C., an annealing time was 24 hours, and an argon flow rate was set to 200 sccm. Since the copper-zinc atomic ratio is preset to 35:65, an alloy sample color is dark gray. As shown in the X-ray diffraction (XRD) pattern of FIG. 5, the obtained copper-zinc alloy in the third composite structure is a y phase. The third composite structure is de-alloyed to obtain a porous copper composite having a porous structure by an electrochemical method. A de-alloying system used is a three electrode system. A counter electrode is a platinum electrode, a reference electrode is a standard silver electrode, and a working electrode is the third composite structure. A corrosion potential is set to −0.2 V. After a period of de-alloying the third composite structure, a corrosion current is close to 0 A, indicating that the active zinc component is completely removed, and the porous copper composite is obtained. As shown in FIG. 3, the carbon nanotube tubes are uniformly dispersed in the porous copper composite without agglomeration. The reason is that the carbon nanotubes are uniformly dispersed in the carbon nanotube film; on the other hand, the multiple pressing process is advantageous for achieving uniform dispersion of the carbon nanotubes in the porous copper composite. Therefore, the porous copper composite has a three-dimensional nanoporous structure, and the structure of the three-dimensional nanoporous structure is mainly determined by alloy composition and dealloying conditions.

The method for making a porous copper composite has the following characteristics. Firstly, a variety of carbon nanostructure can be used as the reinforcing phase to form the porous copper composite. Second, the method is convenient and efficient and without complicated and expensive equipment, and the performance of porous copper composite can be easily adjusted Third, the volume fraction of the carbon nanostructure in the porous copper composite can be adjusted by controlling the content of the carbon nanostructure in the first composite structure and the number of the process of pressing the second composite structure. Fourth, the distribution of carbon nanostructures in the porous copper composite can be achieved by controlling the number of the process of pressing the second composite structure. Fifth, the carbon nanostructure partially covers the porous copper pore walls or copper ligament surfaces, and thus the carbon nanostructure will not hinder the intrinsic physicochemical properties of the porous copper.

The porous copper composite has the following characteristics. Firstly, the porous copper composite comprises at least one carbon nanotube structure, and the porous copper composite has good electrical conductivity, toughness and stability due to good mechanical strength, toughness and electrical conductivity of the carbon nanotube structure. Second, the porous copper composite has a porous structure, at least one carbon nanotube structure is disposed in the plurality of the copper ligaments. Thus, the specific surface area of the porous copper composite is increased. Third, the plurality of carbon nanotubes are dispersed in the porous copper composite. Thus, the porous copper composite can form a free-standing structure.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will, therefore, be appreciated that the embodiments described above may be modified within the scope of the claims.

What is claimed is:

1. A method for making a porous copper composite, comprising:

S10, providing a carbon nanostructure reinforced copper composite substrate, and plating a salt solution of an active metal on a surface of the carbon nanostructure reinforced copper composite substrate to form an active metal layer and obtain a composite substrate, wherein the carbon nanostructure reinforced copper composite substrate comprises a copper substrate and a carbon nanostructure, the carbon nanostructure is disposed on a surface of the copper substrate, the carbon nanostructure comprises a plurality of carbon nanotubes, and the salt solution of the active metal comprises a plurality of active metal atoms located in gaps between adjacent carbon nanotubes;

S20, stacking at least two composite substrates to form a first composite structure;

S30, pressing the first composite structure to form a second composite structure;

S40, annealing the second composite structure to form a third composite structure, wherein an annealing process of the second composite structure comprises steps: (S401) heating the second composite structure at a temperature higher than 300° C. to thermally diffuse atoms of the copper substrate and the active metal layer; (S402) annealing and cooling the second composite structure to make the plurality of active metal atoms and a plurality of copper atoms form an alloy; and S50, dealloying the third composite structure to form a porous copper composite.

2. The method of claim 1, wherein a volume fraction of the carbon nanostructure in the composite substrate is less than or equal to 70%.

3. The method of claim 1, wherein the carbon nanostructure comprises at least one carbon nanotube film or at least one graphene film.

4. The method of claim 1, wherein step S30 further comprises a process of alternatively folding and pressing the second composite structure.

5. The method of claim 4, wherein in each folding and pressing process, a thickness of the first composite structure after pressing is reduced to less than 70% of a thickness of the first composite structure after folding.

6. The method of claim 4, wherein the folding and pressing process is repeated at least two times.

7. The method of claim 1, wherein further comprises the step of scraping the surfaces of the copper substrate and the active metal layer to expose fresh surface of the copper substrate and the active metal layer before step S10 after step S20.

8. The method of claim 7, wherein an exposed fresh surface of the active metal layer is directly in contact with an exposed fresh surface of the copper substrate.

9. The method of claim 1, wherein the alloy is directly grown on surfaces of the plurality of carbon nanotubes during a annealing process in S40.

10. The method of claim 9, wherein an interface between the plurality of carbon nanotubes and the alloy is a coherent or semi-coherent interface.

11. The method of claim 1, wherein the alloy consists of the plurality of active metal atoms and the plurality of copper atoms.

12. The method of claim 1, wherein the second composite structure is annealed at a temperature 500° C. for 24 hours, and Zn atoms and Cu atoms are diffused to form the alloy with homogenous composition.

13. The method of claim 1, wherein the salt solution of the active metal is a $ZnSO_4$ solution, and the active metal layer is a zinc film.

14. The method of claim 1, wherein an atomic ratio of copper to the active metal is in a rang from 2:8 to 8:2.

* * * * *